Sept. 23, 1924.  
C. W. HART  
TRACTOR  
Filed March 18. 1920

Inventor  
Charles W. Hart  
By Erwin Wheeler & Woolard  
Attorneys.

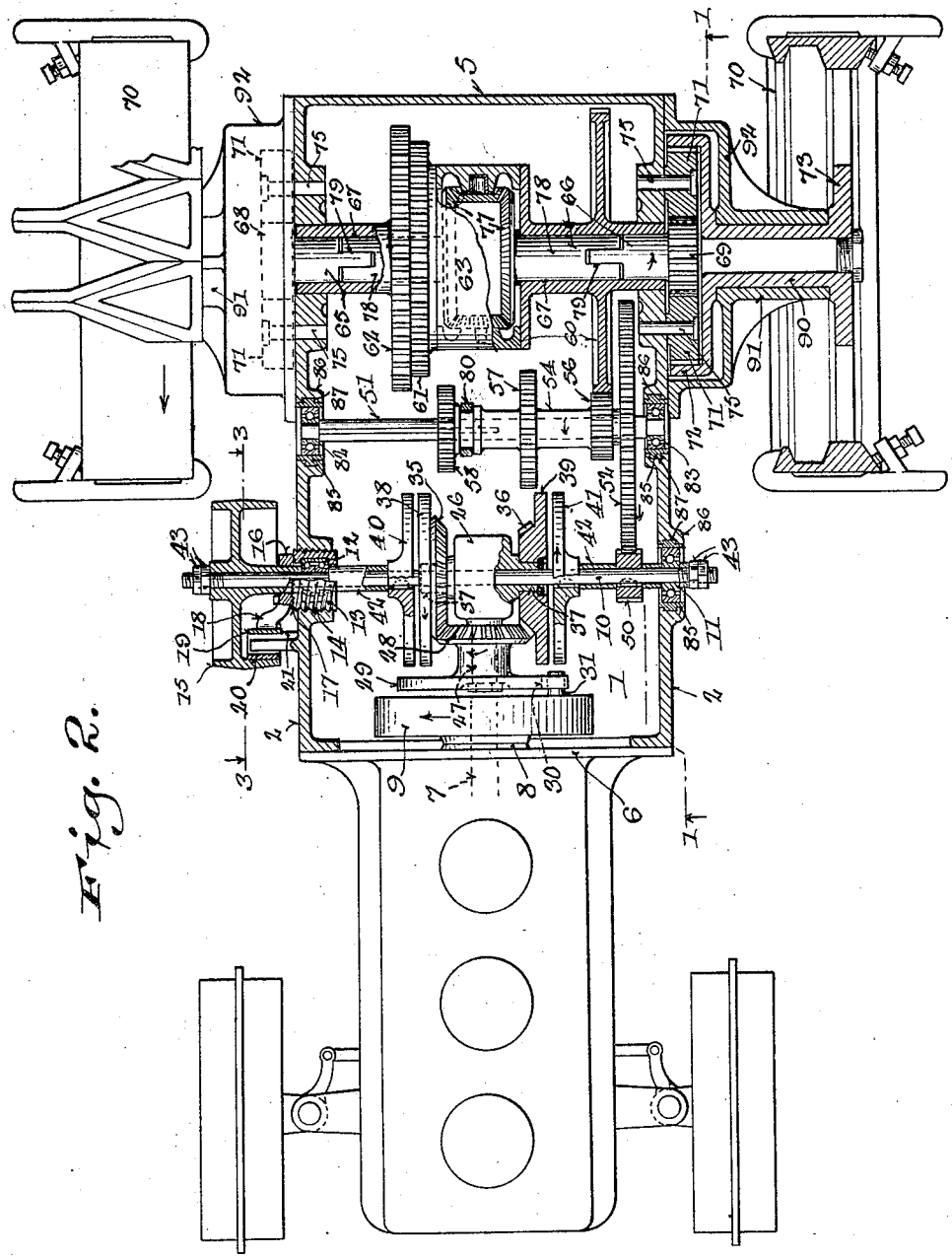

Patented Sept. 23, 1924.

1,509,293

UNITED STATES PATENT OFFICE.

CHARLES W. HART, OF MILWAUKEE, WISCONSIN.

TRACTOR.

Application filed March 18, 1920. Serial No. 366,761.

*To all whom it may concern:*

Be it known that I, CHARLES W. HART, a citizen of the United States, residing at Milwaukee, county of Milwaukee, and State of Wisconsin, have invented new and useful Improvements in Tractors, of which the following is a specification.

My invention relates to improvements in tractors, and pertains especially to that class of motor driven vehicles known as farm tractors employed for tilling, harvesting, threshing and various other purposes in connection with agricultural occupations and those allied thereto.

The requirements for a successful farm tractor are quite different from those relating to ordinary trucks or other motor driven vehicles intended for travel along hard roadways, altho heretofore it has been generally attempted to employ engines and power transmitting mechanisms of a similar nature and to construct the bodies of the vehicles along similar lines, without knowledge, or at least without adequate consideration, of the peculiar nature of the problems to be solved.

The object of my invention is to provide a form of tractor having a boxlike body which may be conveniently formed of cast metal and which constitutes a substantially oil tight casing within which all of the elements of a specially designed power transmitting mechanism may be housed, preferably within a single chamber or cavity to which access may be readily had by the removal of a cover or the opening of a door in the top wall; also to provide power transmitting mechanism which may be conveniently assembled and operated within such a box or body; to provide a form of power transmitting mechanism in which a main clutch or set of clutches may be combined in a single unit with reversing mechanism and this unit assembled and installed within the casing independently, with the gears in accurate mesh, and subsequently coupled to the engine in such a manner that absolute accuracy of position relatively to the engine shaft will not be essential in order to avoid destructive stresses or wearing contacts of imperfectly engaging parts.

Further objects of my invention are to provide an improved form of shifting mechanism for shifting the main clutch into and out of neutral position and into and out of forward driving or reversing position; to provide means whereby the shifting mechanism may be operated directly from the forward drive into the reverse without imposing destructive strains upon the parts; to provide means whereby an exteriorly operated shifting lever may be utilized to actuate the shifting mechanism without admitting dust or grit to the interior of the casing; to provide means for utilizing the same lever for setting an exterior brake; and to provide accurately positioned mountings for the shaft bearings, formed of non-shrinking metal cast in position.

A still further object of my invention is to provide means whereby a variable speed mechanism may be combined with the differential gear set in such a manner as to not only provide direct gear drives at each speed, but to utilize the reversing clutch for variable speeds in both directions; to eliminate expensive shaft connections between the driven members of the differential gear set and the traction wheels by providing slip joint or sliding jaw connections between the hubs of said gear members and the hubs of axially disposed wheel driving pinions; and to provide means for transmitting motion from the master pinions to the traction wheels in which the driving pressure is reduced by division in the internal gear carried by the wheel hub, and in which the driving pressure is balanced and received by the casing. These and other objects and advantages sought in my improved construction will be set forth more in detail in the following description:

In the drawings:—

Figure 2 is a plan view of the same showing the casing in horizontal section on a plane common to the transmission shaft axes.

Like parts are identified by the same reference characters thruout the several views.

Figure 1:
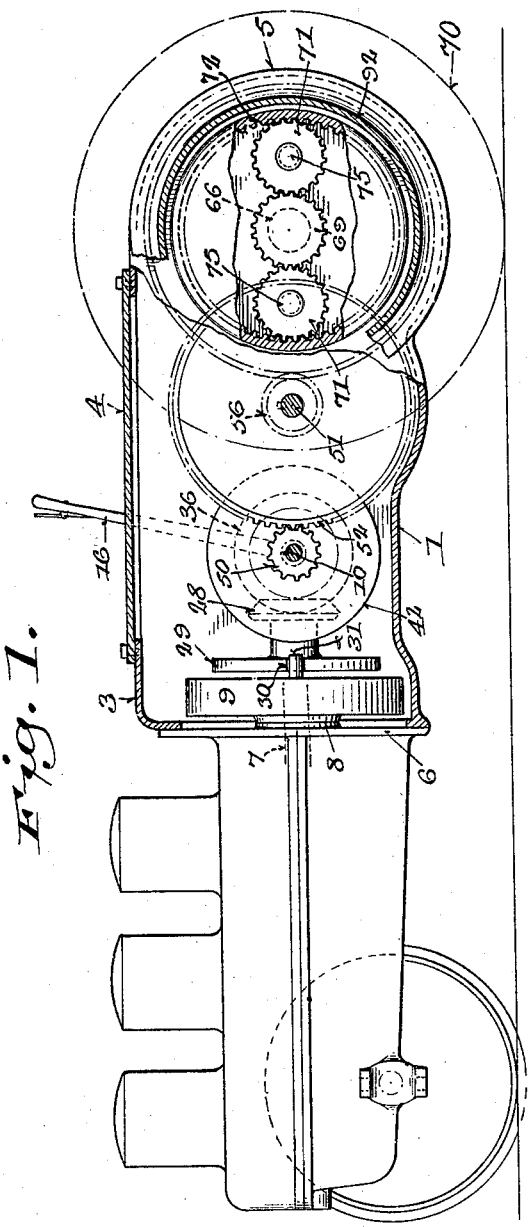
Figure 1 is a side elevation of my improved tractor.
Figure 3:
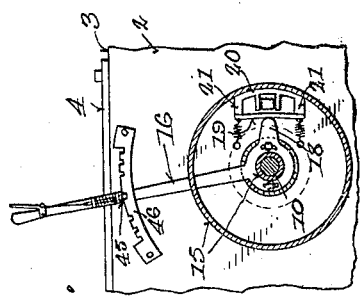
Figure 3 is a detail view of the pulley, brake and controlling lever, as seen from the outer side, the pulley and shaft being shown in cross section.

The body casing and engine casing or block are separately formed. The body casing is in the form of a box having a bottom 1 which may be nearly flat, but is preferably somewhat depressed in its central portion, with concavely or obliquely sloping interior surfaces. This bottom wall, together with the side walls 2 and top 3 may be formed integrally and preferably of cast metal, the top wall however, being provided with an opening normally covered by a lid or door 4, the removal of which permits free access to the interior. This opening is of such size as to expose all of the working parts when the door is opened, and to allow access thereto for the purpose of removal or repair. The back wall 5 may also be formed integrally with the other walls above mentioned, but the front end may be left open, at least as to the upper portion, to be closed by the rear wall 6 of the engine casing when the latter is assembled. The engine shaft 7 is supported entirely in the engine or motor unit. Bearings are provided at 8, and the fly wheel 9 is mounted on the engine shaft preferably within the body casing. The opening in the front end of the casing is large enough to allow the fly wheel to pass thru it.

At the front end of the body casing a transversely disposed shaft 10 is mounted. At one end this shaft is provided with bearings 11 in the side wall of the casing. The shaft 10 projects thru the opposing side wall, but at this point it is provided with bearings 12 within a drum 13, the exterior surface of which is screw threaded as shown at 14 and fitted to a threaded opening in the casing wall, the arrangement being such that by rotating the drum 13 in its threaded bearings, the shaft 10 may be shifted to the right or left according to the direction in which the drum turns. The shaft bearings in the drum are combination journal and thrust bearings of any well known type.

Exteriorly the shaft 10 is provided with a pulley 15 to facilitate power transmission to other machinery thru the medium of a belt. This pulley is preferably splined to the shaft to allow the shaft adjustment hereinafter described. A drum actuating lever 16 is adjustably secured to the drum 13 at 17 and has a short arm 18 adapted to bear upon a flat spring 19, which, when flexed, transmits motion to a brake shoe 20, movably supported by bracket arms 21 upon which the ends of the spring 19 are also mounted. The arrangement is such that the short arm 18 exerts maximum pressure on the brake when the lever is midway in its traverse from one extreme position to the other.

The central portion of the shaft 10 extends thru a mounting 26 projecting upwardly from the bottom 1 of the casing and provided with a forwardly projecting stud shaft 27 which supports a driving pinion 28. The hub of this pinion 28 is provided with a coupling disk 29, notched at 30 to loosely receive a crank pin 31 connected with the fly wheel 9. The driving pinion 28 is beveled and is in continuous mesh on opposite sides with the beveled gear wheels 35 and 36. These are mounted on tubular studs 37 thru which the shaft 10 passes. The outer faces of these beveled gear wheels 35 and 36 are provided with clutch disks 38 and 39, adapted respectively to be engaged by mating disks 40 and 41, which are splined to the shaft 10, and positioned thereon by spacing sleeves 42, co-operating with exterior nuts 43. By adjusting the nuts 43, the shaft may be adjusted axially to properly position the clutch disks 40 and 41, or to take up wear.

The beveled gear wheels 35 and 36 will, of course, be continuously driven in opposite directions. Therefore, when clutch disk 40 is in frictional contact with disk 38, motion will be transmitted to rotate shaft 10 in one direction, whereas when disk 41 is in contact with disk 39 the shaft 10 will be rotated in the opposite direction. The disks 40 and 41 are shifted into and out of contact with the associated disks 38 and 39 by means of the lever 16, and drum 13 is employed to shift the shaft 10 and the disks 40 and 41 longitudinally for this purpose. The intermediate position is, of course, the neutral position, with both disks 40 and 41 out of contact with their associated or mating disks 38 and 39. When shifting the shaft by rotating the drum the spacing sleeves 42 and disks 40 and 41 move with it as if integrally connected, whereas, when the nuts 43 are adjusted, the shaft is stationary, and the pulley, spacing sleeves and disks are moved inwardly or outwardly along the shaft. The drum 13 also requires a slight readjustment, but the movement is, of course, short and the lever may be readjusted on the drum, if necessary.

By mounting the gear set, comprising the driving pinion 28 and gear wheels 35 and 36, upon stud shafts connected with the bearing block 26, it is obvious that this gear set may be assembled as a unit and mounted in the casing with stud shaft 27 in approximate alignment with the motor shaft without danger of injury to the working parts if absolute accuracy in alignment is not secured. The loose driving connections between the fly wheel 9 and the disk 29 relieves both driving and driven members from strain. The motor crank shaft, whether loaded or not, has no end thrust and can have the slight floating end motion essential to good working. The crank pin 31 can be placed at some distance from the center of the motor shaft and reactionary side pressure minimized to a fraction of that which exists where the driving gear is mounted directly on the crank shaft. The pressure continuously changes in direction. Therefore the tendency to wear the engine shaft bearings in one direction is avoided. Oil is not squeezed out, and in general the driving conditions are improved by reason of this free self-adjusting coupling between the fly wheel 9 and the driving pinion 28. Assembling and disassembling of the motor unit from the transmission unit, is also facilitated. Owing to the fact that the driving pinion 28 does not require adjustment upon or in exact relation to the engine shaft, it is possible to assemble it as a part of a transmission unit which includes the beveled gear wheels 35 and 36 and the driving clutch members 38 and 39. The gear wheels may therefore be accurately adjusted so that the teeth mesh with absolute accuracy.

It will, of course, be understood that the gear wheels 35 and 36 are continuously rotating and that they revolve independently of the shaft 10, and are independently supported by the tubular studs 37. The shaft 10 may have a central set of bearings in the block 26 if desired, but it is free to move longitudinally in these bearings. The lever 16 is provided with a latch 45 adapted to engage in suitable notches in a relatively stationary segment 46 connected with the casing, whereby the shaft 10 may be held in any position to which it has been shifted pending a readjustment of the lever. This lever may be adjusted, at 17, if necessary, when the adjustment of the nuts 43 is changed, as above described.

Shaft 10 is provided with a pinion 50 which drives an intermediate shaft 51 thru a gear wheel 52. The pinion 50 is splined to shaft 10 to allow it to shift with the spacer sleeves 42, when the nuts 43 are adjusted. This pinion is wide enough to remain in mesh with the gear wheel 52 in all stages of adjustment of shaft 10.

A sleeve 54, splined to the shaft 51, carries speed varying gears 56, 57, and 58, which are adapted to mesh respectively with gear wheels 60, 61 and 62, mounted upon or rigidly connected with a differential gear casing 63 or with that portion of the casing which comprises or carries the driving member of the differential gear set.

The wheel driving shaft members 65 and 66 have bearings at 67 in the differential casing, and exterior to the casing, these shafts are provided with pinions 68 and 69, respectively, which constitute master pinions for the traction wheel gear sets. Each of these master pinions drives its associated traction wheel 70 thru a set of oppositely or symmetrically disposed spur pinions 71 and an internal ring gear 72 connected with the wheel hub 73. Each of the spur pinions 71 is mounted upon a stud axle or shaft 75 rigidly socketed in the body casing. Any desired number of these pinions 71 may be employed, but for the lighter machines I prefer to employ two oppositely disposed pinions, whereas, for the heavier machines I prefer to employ four and to arrange two of them in a horizontal line thru the axis of the master pinion and the other two in a vertical line thru said axis. By disposing these intermediate pinions symmetrically or on opposite sides of the master pinion it is obvious that the driving pressures will be balanced in part and in part received by the casing. The thrust of the teeth is counteracted as to any tendency to displace the master pinion or the wheel hub. The driving pressure is, of course, reduced by division in proportion to the number of intermediate pinions 71.

The driven wheels 77 of the differential gear set are provided with elongated hubs 78, which constitute sections of the driving shafts. These, and also the axle members 65 and 66 may be tubular in form. They are interlocked as shown at 79, whereby relative longitudinal movements may be permitted, and floating effects secured, the usual connecting shafts being dispensed with.

I preferably mount the shafts 10 and 51 substantially in the same horizontal plane with the live axle shafts 65 and 66 but this is not essential. The sleeve 54 is shifted by means of an ordinary fork 80, which may be actuated from the exterior by any suitable means, such as a hand wheel shaft, racks and pinion mechanism. The bearings at 11 for the shaft 10 and also the bearings at 82 and 83 for the shaft 51 may be seated in suitable mountings 85 formed of type metal, which are cast in position within suitable apertures formed in the body casing during the operation of casting the latter. It will be noted that the body casing has its wall thickened around these bearing apertures, as shown at 86, and this thickened portion is provided with an annular dovetail groove 87 into which the molten type metal may flow to an interlocking position during the operation of casting the mountings. I employ type metal partly for the reason that it is non-shrinking and also for the reason that it is peculiarly adapted to form a durable mounting for the bearing rings.

By employing a boxlike body, I am enabled to make the same in a single casing, dispensing with the so-called main frame, with oil pan below and housing above. The single integrally cast box not only facilitates the exclusion of dust and other foreign matter from the bearings and from the interior working parts, but it provides a substantially rigid, compact structure which will not weave or twist under torsional strain in a manner to interfere with the best possible working conditions. On the other hand, the loose connection of the engine shaft with the transmission mechanism within the box or body casing makes it possible to not only mount the engine unit separately and allow it to run freely in its own bearings, but it also allows the engine support to respond to weaving strains as a non-weaving unit with no tendency to transfer any portion of its bodily movement to the interior of the body casing. This may be true notwithstanding the fact that the engine casing is bolted to the body casing, for if packing is employed at this joint, the slight independent movement necessary to avoid excessive strains may easily be permitted and in any case the joint will allow of some movement under heavy strain. It will of course be understood that the strains which are here referred to, while very heavy and frequently of a destructive character if not relieved, are nevertheless capable of being relieved sufficiently to avoid injury by allowing very slight movement of connected parts.

It will also be observed that my arrangement of clutches not only obtains the advantage of two clutches, one for forward and one for backward motion, with a simplicity seldom obtained where only one is used, but I also secure a very great added advantage by having one member of each clutch on the back of the driven wheels of the beveled gear set, whereby the end pressure or reactionary thrust usually existent in beveled gear driving mechanisms is entirely neutralized by the pressure of the clutch. In other words, the pressure of the outer clutch disk upon the inner one is in a direction to wholly counteract the outward thrust developed by the gear teeth of the working wheel. Also the center bearing between the two driven bevel gear wheels 35 and 36 enables me to have bearings on both sides of the members of the clutch, thereby insuring smooth, true running conditions with consequent greater durability and holding power of the clutch in proportion to the pressure thereon.

By means of the shifting drum 13 with external thread and internal ball thrust, a true and positive motion is imparted for setting and unsetting the clutch, avoiding all angular pressure and eliminating the necessity for multiplying levers and providing dogs, springs and adjustment screws, such as are commonly used in clutch shifting mechanisms and which are subject to wear, vibration, sticking and breaking, and which may result in unequal pressures and erratic pressures even when in working condition. Nearly all clutches which employ indirect clutch setting and releasing mechanisms are subject to very dangerous dragging or "holding in," whereas, in my improved construction the clutches are released with the same positiveness that they are set. The friction surfaces are instantly separated during the initial movement toward releasing position, with plenty of space to prevent dragging or accidental re-engagement. Further, it will be observed that in controlling the movements of the tractor, only two natural motions of the lever are required. For example, when the clutch lever is pushed forwardly the machine moves in that direction,—when the lever is pushed back to neutral position the machine stops positively,— and when the movement of the lever continues in a backward direction the tractor moves backwardly.

Another very decided advantage is to be found in the fact that it is possible to throw the lever into reverse position while the tractor is moving forwardly and to do this without setting up destructive strains. This is due to the fact that the clutch disks will slip rotatively. Under such conditions, particularly, it is possible, without moving the control lever to full reversing position, to use the reverse clutch in co-operation with the brake shoe 20 when a quick stop is desired. It will also be observed that when belt power is being used, the pulley is under control in exactly the same manner as the tractor is when in motion. There is a great advantage in extending the complete and reliable control above described to any auxiliary machinery. It will also be noted that my improved tractor has three speeds forward and three speeds reverse and that this is accomplished in a very simple manner owing to the fact that the reverse is accomplished by simply resetting the clutch mechanism. The maneuvering ability of the ordinary tractor is relatively very clumsy and much loss of time results, due to the necessity of shifting gears successively to obtain reverse and to the necessity of manipulating several levers or manipulating a single lever in a plurality of directions. In my improved construction an instantaneous reverse is possible regardless of the speed. In other words, it is not necessary to go from high speed to low speed and then into reverse, a direct transmision from high speed to reverse being possible. This is of great importance for the reason that men must frequently work in close proximity to tractors, not only at the sides thereof, but also behind them or in front of them. Dragging and sticking clutches and awkward controls have therefore heretofore caused many personal injuries, loss of life, destruction of property and frequently great loss of time to large crews of working forces. For these reasons, the controlling mechanism above described is regarded as of great importance.

Still another advantage is obtained by arrangement of the transmission shafting in a transverse relation to the body casing, in connection with the location of the driven members of the differential gear set with their axes in line with those of the master pinions which drive the traction wheels, i. e., with all of these parts in the so-called rear axle line. In a general way this arrangement is obtained in motor driven vehicles employed for transportation and pleasure purposes, but not for the same purpose nor with the same result. In my improved construction the result obtained is a relatively short body casing and a very compact transmission mechanism, operative with minimum thrusts and loss of power as well as with better balance and increased stability. In fact, with this construction, I am enabled to construct the body casing in a much more nearly cubical form than has heretofore been attained, and I therefore secure maximum strength in the body, with minimum weight or mass, and with a low center of gravity.

By providing the wheels 70 with tubular hubs 90 operating within external tubular axle members 91 supported from the body casing by bonnet connections 92, the weight of the tractor is applied directly on the hubs of the rear wheel substantially in the central plane of the wheel, that is to say, the pressure is substantially equally distributed on opposite sides of this plane. The internal gear and hollow hub of the rear or traction wheels are integral and no internal axle is used. The overhangs and disastrous rolling of axles under bending pressure is absent and the large hollow shafts formed by the rear wheel hubs, together with the hollow driving axle members on which the master pinions are located and the hollow driven members of the differential gear set, taken in connection with the fact that the driving pressures from the master pinions to the wheels are divided and balanced, make it possible to produce a light weight construction having a strength several times greater than that of the corresponding parts in the ordinary tractor.

I claim:—

1. A tractor having a body provided with a transversely disposed axially movable shaft in its forward portion, a beveled gear set having two wheels rotatable in opposite directions about said shaft, a driving wheel in mesh with said oppositely rotating wheels, a centrally disposed bearing for the shaft provided with supporting mountings for the driving and driven gear wheels, friction clutch connections for transmitting motion from said oppositely rotating wheels to said shaft, and means for shifting said clutch connections alternatively into and out of operative position to reverse the direction of shaft rotation.

2. A tractor having a body provided with a transversely disposed axially movable shaft in its forward portion, a beveled gear set having two wheels rotatable in opposite directions about said shaft, a driving wheel in mesh with said oppositely rotating wheels, paired flat faced slip clutch connections supported by the driven gear wheels and shaft respectively for transmitting motion from said wheels to said shaft, and means for shifting the shaft supported clutch connections alternatively into and out of operative position to reverse the direction of shaft rotation, said beveled gear wheel set having a unitary mounting provided with stud bearings for the respective wheels said shaft extending axially through the studs which support the driven gear wheels and having a central bearing in said mounting.

3. A tractor having in combination a beveled gear wheel set provided with a central unitary mounting, having stud shafts to support the driving and driven wheels, said set comprising a pair of oppositely rotating driven wheels and a driving wheel in mesh with both, and each of the oppositely rotating wheels being provided with friction clutch connections for power transmission.

4. A tractor having in combination an engine shaft provided with a crank pin, and separately mounted beveled gear wheel set provided with a unitary mounting, stud shafts to support the wheels, said set comprising a pair of oppositely rotating driven wheels and a driving wheel in mesh with both, and each of the oppositely rotating wheels being provided with friction clutch connections for power transmission, the driving member of the set being also provided with a notched power receiving member in cooperative relation to the crank pin loosely engaged in said notch and supported to revolve in substantially the same plane while allowing eccentric variation therefrom.

5. A tractor having a beveled gear wheel set having a unitary mounting, said set, including a pair of oppositely rotating wheels and a driving wheel, in combination with an independently mounted engine shaft, and a crank pin operatively connected with the shaft, and arranged in loose jointed connection with the driving member of said set, whereby the gears of said set may be kept in perfect intermeshing relation and driven without cramping strain from an engine shaft which may or may not be perfectly aligned with the axis of the driving gear wheel.

6. A tractor having a beveled gear wheel set including a pair of oppositely rotating wheels and a driving wheel in combination with an engine shaft, a crank pin operatively connected with the shaft and arranged in loose jointed connection with the driving member of said set, said loose jointed connection being adapted to allow shifting self-adjusting movements of the crank pin in its associated members of said connection to avoid cramping effects and to allow floating movements of the engine shaft.

7. A tractor comprising the combination of a body casing provided with a cross shaft near its front end, an engine mounting detachably connected with said body, an engine shaft having its bearings in the engine mounting and provided at its rear end with a crank pin, a gear wheel carried by the body casing with its axis in approximate alignment with the engine shaft, a member rigidly connected with said gear wheel and provided with a notch which loosely receives said crank pin, tractor wheels supporting the rear end of the body casing, and means for transmitting motion from said gear wheel through the cross shaft to the tractor wheels, said casing having a central bearing member for the cross shaft which also provides a mounting for the gear wheel.

8. A tractor having a body casing and a detachable engine casing, an engine shaft mounting in the engine casing and motion transmitting connections mounted in the body casing, said motion transmitting connections including a driving member supported to revolve approximately on the axis of the engine shaft and provided with a recess, and a crank pin rigidly connected with said shaft and loosely engaged in said recess, whereby exact alignment of the engine shaft and the driving member of the transmitting mechanism is unnecessary.

9. A tractor having in combination a body casing, a separate engine casing, an engine shaft in the engine casing, a cross shaft in the body casing near the front end thereof, a central bearing member for the cross shaft, a reversing gear set having its driving and driven members supported by said central bearing member, a connection between the engine shaft and the driving member of said gear set adapted to permit relative longitudinal and transverse movement of the shaft and driving member, slip clutch connections between the driven members of said set and the cross shaft, adapted to be interchangeably adjusted in motion transmitting relation by axial movement of the cross shaft, and means for controlling the position of the cross shaft from a point exterior to the casing.

10. A tractor having a body portion provided with a transversely disposed shaft, a set of motion transmitting members adapted to revolve about said shaft independently thereof, means for actuating said members in opposite directions, a drum in threaded connection with the body, and provided with thrust bearings for said shaft adapted to move the shaft axially when the drum is rotated in its threaded bearings, a controlling lever for rotating said drum, and friction disks on the shaft adapted to alternatively engage the continuously driven oppositely rotating members, whereby the shaft may be revolved in opposite directions, together with a pulley on said shaft, and a brake in operative relation to said pulley, and the drum actuating lever, when in neutral position, being adapted to set the brake in pulley engaging position.

11. A tractor having freely separable motor and transmission units adapted for operative engagement when out of exact alinement, said tractor being provided with detachable casing connections.

12. A tractor having in combination tubular supporting axle members, tubular wheel hubs therein, and tubular driving axle members provided with master pinions in balanced pressure driving connection with the wheel hubs.

13. A tractor having in combination a body portion provided with laterally projecting supporting axle members arranged to constitute a housing for the wheel driving connections, and wheels having hubs extending thru said axle members and provided with enlarged inner ends having internal gear rings adapted to facilitate transmission of power to the wheels.

14. A tractor having in combination a body laterally projecting tubular members provided with relatively enlarged housing connections to the body, wheels having hubs extending thru said axle members, gear rings attached to the hubs and located within said housing connections, and driving axles supported by the body and operatively connected to actuate said gear rings, hubs and wheels.

15. A tractor having in combination a body, laterally projecting tubular members provided with relatively enlarged housing connections to the body, wheels having hubs extending thru said axle members, gear rings attached to the hubs and located within said housing connections, and driving axles supported by the body and operatively connected to actuate said gear rings, hubs and wheels, said driving axles being provided with axially disposed master pinions within the gear rings, and a set of intermediate pinions for transmitting motion from each master pinion to the gear ring, the body being provided with stud axles rigidly mounted thereon and supporting the pinions for motion transmission with balanced and divided driving pressures upon the gear ring.

16. A tractor having in combination a body, laterally projecting tubular members provided with relatively enlarged housing connections to the body, wheels having hubs extending thru said axle members, gear rings attached to the hubs and located within said housing connections, and driving axles supported by the body and operatively connected to actuate said gear rings, hubs and wheels, said driving axles being provided with axially disposed master pinions within the gear rings, and a set of intermediate pinions for transmitting motion from each master pinion to the gear ring, the body being provided with stud axles rigidly mounted thereon and supporting the pinions for motion transmission with balanced and divided driving pressures upon the gear ring, a differential set having driven members provided with elongated tubular hubs constituting sections of the driving axles in slip joint connection with the outer sections which carry said master pinions.

17. A tractor, having a cast metal body, transversely disposed transmission shaft journaled in the body, an independently mounted driving and reversing gear set in the forward portion of the body, friction clutches for operatively connecting the same with the initial transmission shaft, and an engine shaft having a loose crank connection with the driving gear of said set, adapted to allow a slipping self-adjusting pressure contact of the pin, with the driven member of said connection.

18. A tractor having a cast metal boxlike oil containing body provided with mountings for all driving axle and transmission shafts and their bearings, in combination with transmission shafts and gearing having a driving member mounted in the body independently of the shafting, an engine shaft mounted independently of the body, and a self-adjusting coupling between the engine shaft and dividing member adapted to allow relative longitudinal floating movements of the engine shaft.

In testimony whereof I affix my signature in the presence of two witnesses.

CHARLES W. HART.

Witnesses:
LEVERETT C. WHEELER,
O. C. WEBER.